US011123699B1

(12) United States Patent
Gilman (10) Patent No.: US 11,123,699 B1
(45) Date of Patent: Sep. 21, 2021

(54) CONTAINER INCLUDING A MIXED BEVERAGE

(71) Applicant: Michael Gilman, Redondo Beach, CA (US)

(72) Inventor: Michael Gilman, Redondo Beach, CA (US)

( * ) Notice: Subject to any disclaimer, the term of this patent is extended or adjusted under 35 U.S.C. 154(b) by 0 days.

(21) Appl. No.: 17/225,855

(22) Filed: Apr. 8, 2021

Related U.S. Application Data

(60) Provisional application No. 63/152,708, filed on Feb. 23, 2021, provisional application No. 63/161,028, filed on Mar. 15, 2021.

(51) Int. Cl.
| | |
|---|---|
| *B01F 13/00* | (2006.01) |
| *A23L 2/02* | (2006.01) |
| *A23L 2/38* | (2021.01) |
| *A23L 2/54* | (2006.01) |
| *B65D 23/04* | (2006.01) |

(52) U.S. Cl.
CPC .............. *B01F 13/002* (2013.01); *A23L 2/02* (2013.01); *A23L 2/38* (2013.01); *A23L 2/54* (2013.01); *B01F 13/0022* (2013.01); *B65D 23/04* (2013.01)

(58) Field of Classification Search
CPC ...... B01F 13/002; B01F 13/0022; A23L 2/02; A23L 2/38; A23L 2/54
See application file for complete search history.

(56) References Cited

U.S. PATENT DOCUMENTS

| | | | | |
|---|---|---|---|---|
| 6,332,704 | B1 * | 12/2001 | Gasser | A47J 43/27 |
| | | | | 220/568 |
| 6,796,705 | B1 * | 9/2004 | Khubani | A47J 43/046 |
| | | | | 366/197 |
| 7,270,156 | B2 * | 9/2007 | Beesley | A47J 27/004 |
| | | | | 141/82 |
| 9,301,639 | B2 * | 4/2016 | Wang | B01F 3/04453 |
| 9,801,500 | B2 * | 10/2017 | Ven Der Woning | A47J 27/004 |
| 10,251,510 | B2 * | 4/2019 | Ryan | A47J 31/4407 |
| 10,448,654 | B2 * | 10/2019 | Kapchie | A23C 9/1524 |

(Continued)

FOREIGN PATENT DOCUMENTS

| | | | |
|---|---|---|---|
| CN | 201996374 | * | 10/2011 |
| CN | 208822409 | * | 5/2019 |

(Continued)

OTHER PUBLICATIONS

English Translation for CN201996374 published Oct. 2011.*

(Continued)

*Primary Examiner* — Anthony J Weier
(74) *Attorney, Agent, or Firm* — Lewis Roca Rothgerber Christie LLP (57) ABSTRACT

A mixed beverage product includes a container defining an interior chamber, an agitator mechanism coupled to the container, and a beverage contained in the inner chamber in the container. The beverage may be a coffee beverage, or the beverage may be carbonated water and a base beverage, such as fruit juice, veggie juice, or coffee. The agitator is configured to aerate the coffee beverage to form a foam layer on the coffee beverage, or to mix the carbonated water with the base beverage to form a foam layer on the beverage.

7 Claims, 10 Drawing Sheets

(56) References Cited

U.S. PATENT DOCUMENTS

| | | | | |
|---|---|---|---|---|
| 2003/0041739 A1* | 3/2003 | Cai | ......................... | A47J 31/14 |
| | | | | 99/287 |
| 2003/0198124 A1* | 10/2003 | Glucksman | ........... | B01F 7/0045 |
| | | | | 366/129 |
| 2007/0221068 A1* | 9/2007 | Boussemart | .......... | A47J 27/004 |
| | | | | 99/279 |
| 2010/0260005 A1* | 10/2010 | Bodum | ................. | A47J 27/004 |
| | | | | 366/144 |
| 2012/0055348 A1* | 3/2012 | Elissen | ............... | A47J 43/1093 |
| | | | | 99/452 |
| 2014/0072689 A1* | 3/2014 | Ho | ...................... | A47J 31/0605 |
| | | | | 426/569 |
| 2015/0250349 A1* | 9/2015 | Ng | ........................ | A47J 31/404 |
| | | | | 215/227 |
| 2016/0175789 A1* | 6/2016 | Shima | ..................... | B01F 13/08 |
| | | | | 99/286 |
| 2016/0270601 A1* | 9/2016 | Hellmann | ............. | B65D 85/73 |
| 2016/0345771 A1* | 12/2016 | Caruso | ................... | A47L 13/12 |
| 2017/0129665 A1* | 5/2017 | Rolfes | ................. | B65D 1/0246 |

FOREIGN PATENT DOCUMENTS

| | | | |
|---|---|---|---|
| CN | 211559798 | * | 9/2020 |
| DE | 202007016771 | * | 3/2008 |
| WO | WO2015167403 | * | 11/2015 |

OTHER PUBLICATIONS

English Translation for CN211559798 published Sep. 2020.*
English Translation for CN208822409 published May 2019.*
English Translation for DE202007016771 published Mar. 2008.*

* cited by examiner

CONTAINER INCLUDING A MIXED BEVERAGE

CROSS-REFERENCE TO RELATED APPLICATION(S)

The present application claims priority to and the benefit of U.S. Provisional Application No. 63/152,708, filed Feb. 23, 2021, and U.S. Provisional Application No. 63/161,028, filed Mar. 15, 2021, the entire contents of both of which are incorporated herein by reference.

BACKGROUND

1. Field

The present application relates generally to various embodiments of a mixed beverage, a container including a mixed beverage, and a method of making a mixed beverage.

2. Description of the Related Art

Beverages that have a foamy head generally have a better flavor profile, improved aromatics, and greater oral tactile sensation than flat beverages without a foamy head. However, many conventional drinks, such as cappuccinos, achieve a foam head by adding dairy or non-dairy ingredients (e.g., milk, heavy cream, oat milk, and/or soy milk) or other ingredients, which increases the calories of the drink. Accordingly, these conventional beverages may be therefore unsuitable for individuals with certain dietary restrictions (e.g., lactose intolerant individuals or individuals on a ketogenic diet) or inconsistent with individual health goals, such as those individuals who practice intermittent fasting.

Furthermore, some conventional drinks require hot preparation to form a foamy head (e.g., a cappuccino requires steaming milk or a dairy substitute), and therefore these beverages require specialized equipment (e.g., a milk steamer) and cannot be readily produced on-the-go. Moreover, the hot preparation of coffee drinks can adversely affect the flavor profile of the coffee (e.g., by increasing the acidity of the coffee).

SUMMARY

The present disclosure relates to various embodiments of a mixed beverage product. In one embodiment, the mixed beverage product includes a container defining an interior chamber, an agitator mechanism in the interior chamber, a beverage contained in the inner chamber in the container. The agitator is configured to mix the beverage to form a foam layer on the beverage.

The beverage may include carbonated water and a base beverage. The base beverage may be fruit juice, veggie juice, or coffee.

The beverage may be a coffee beverage, and the agitator may be configured to aerate the coffee beverage to form the foam layer on the coffee beverage. The interior chamber of the container may not house any liquid ingredients other than the coffee beverage.

The agitator mechanism may include a motor, a battery coupled to the motor, an actuator configured to selectively couple the battery to the motor, and at least one mixing blade coupled to a drive shaft of the motor.

The agitator mechanism may include a static feature, such as a flute, a groove, a protuberance, and/or a fin.

The agitator mechanism may include a rotatable shaft, at least one mixing blade coupled to the rotatable shaft, and a string wound around the rotatable shaft and extending to an exterior of the container, and a spring coupled to the rotatable shaft. Pulling the string is configured to unwind the string from the rotatable shaft and to rotate the rotatable shaft and the at least one mixing blade, and the spring is configured to rewind the string around the rotatable shaft.

The mixed beverage product may also include a cap threadedly coupled to the container. The cap may include an outer annular member threadedly coupled to the container, and an inner annular member threadedly coupled to the outer annular member.

The agitator mechanism may include a ball screw coupled to the inner annular member, a ball nut coupled to the ball screw, and at least one mixing blade coupled to the ball nut.

The present disclosure also relates to various embodiments of a mixed beverage product including a container defining an interior chamber, and a mixed beverage sealed in the inner chamber in the container. The mixed beverage includes a foam layer.

The mixed beverage may include carbonated water and a base beverage, and the base beverage may be fruit juice, veggie juice, or coffee.

The mixed beverage may include an aerated coffee beverage, and the agitated coffee beverage may not include any other liquid ingredients.

In another embodiment, the mixed beverage product includes a can defining an interior chamber, a beverage and a pressurized gas in the interior chamber, and a nozzle coupled to the can. Actuation of the nozzle releases the pressurized gas and the beverage from the interior chamber, and the pressurized gas forms a foam layer on the beverage.

The present disclosure also relates to various embodiments of a method of preparing a mixed beverage product including a foam layer. In one embodiment, the method includes mixing a coffee beverage or a combination of a base beverage with carbonated water at a point-of-sale location to form the mixed beverage product with the foam layer.

The base beverage may be fruit juice, veggie juice, or a coffee beverage.

The mixed beverage product may not include any liquid ingredients other than the coffee beverage or the combination of the base beverage and the carbonated water.

The point-of-sale location may be a juice bar, a coffee shop, or a restaurant.

This summary is provided to introduce a selection of features and concepts of embodiments of the present disclosure that are further described below in the detailed description. This summary is not intended to identify key or essential features of the claimed subject matter, nor is it intended to be used in limiting the scope of the claimed subject matter. One or more of the described features may be combined with one or more other described features to provide a workable device.

BRIEF DESCRIPTION OF THE DRAWINGS

The accompanying drawings, together with the specification, illustrate exemplary embodiments of the present disclosure, and, together with the description, serve to explain the principles of the present disclosure. The drawings are not necessarily drawn to scale.

DETAILED DESCRIPTION

The present disclosure relates to various embodiments of a mixed beverage, a container including a mixed beverage, and a method of making a mixed beverage.

Figure 1:
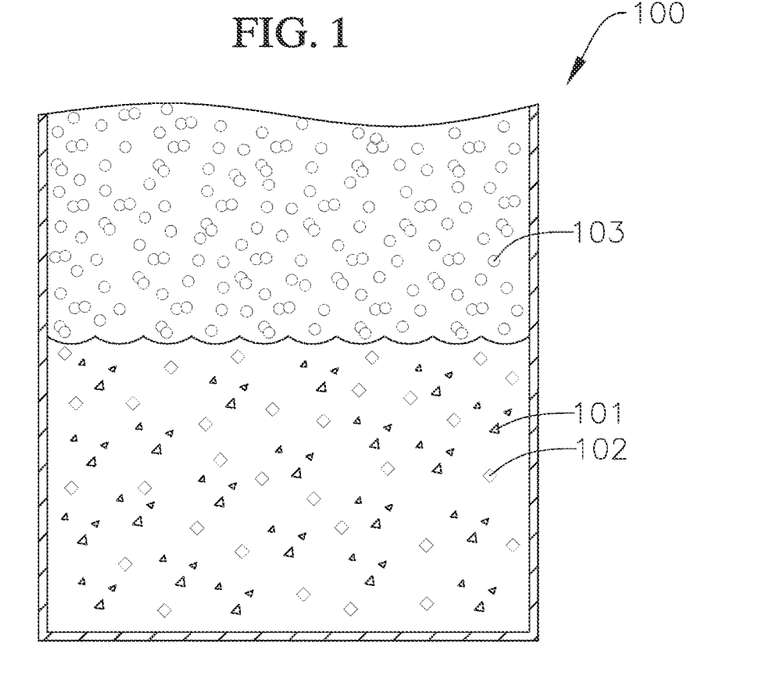
FIG. 1 is a side schematic view of a mixed beverage according to one embodiment of the present disclosure.

With reference now to FIG. 1, a mixed beverage 100 according to one embodiment of the present disclosure includes carbonated water 101 (e.g., natural spring water) mixed with a base beverage 102, such as fruit juice, veggie juice, a caffeinated beverage (e.g., coffee or tea), or combinations thereof. When the carbonated water 101 is sufficiently mixed with the base beverage 102, a foam layer 103 (i.e., a "foam head") develops on an upper surface or an upper portion of the mixed beverage 100, which increases the aromatic profile and flavor profile of the beverage 100 and the oral tactile sensation (i.e., "mouth feel") of the mixed beverage 100 compared to the base beverage 102 alone (e.g., the mixed beverage 100 is "creamier" than an otherwise similar beverage without the foam layer 103, and it enhances the existing flavors of the base beverage 102). The foam layer 103 is also visually appealing and may remain on the upper surface or the upper portion for a sustained duration (e.g., 20 minutes or more) while the user consumes the mixed beverage 100. The length of time that the foam layer 103 remains on the upper surface or the upper portion of the mixed beverage 100 may be a function of the base beverage 102 and the ratio of the carbonated water 101 and the base beverage 102. The foam layer 103 on the upper surface or the upper portion of the mixed beverage 100 is also configured to function as a carrier to support flavor-enhancing ingredients, such as cinnamon or nutmeg, and/or decorative elements, such as a decorative pattern in the foam layer. Additionally, in one or more embodiments, the carbonated water 101 may include minerals, such as magnesium, calcium, sodium, and/or potassium (e.g., the carbonated water 101 may be carbonated mineral water), which provide additional health benefits to the base beverage 102.

The mixed beverage 100 may have any suitable ratio of carbonated water 101 to the base beverage 102, and the ratio may vary depending on the composition of the base beverage 102. In one or more embodiments, the mixed beverage 100 may include a larger proportion of the carbonated water 101 than the base beverage 102. In another embodiment, the mixed beverage 100 may include equal or substantially equal proportions of the carbonated water 101 and the base beverage 102. In a further embodiment, the mixed beverage 100 may include a larger proportion of the base beverage 102 than the carbonated water 101.

Figure 2:
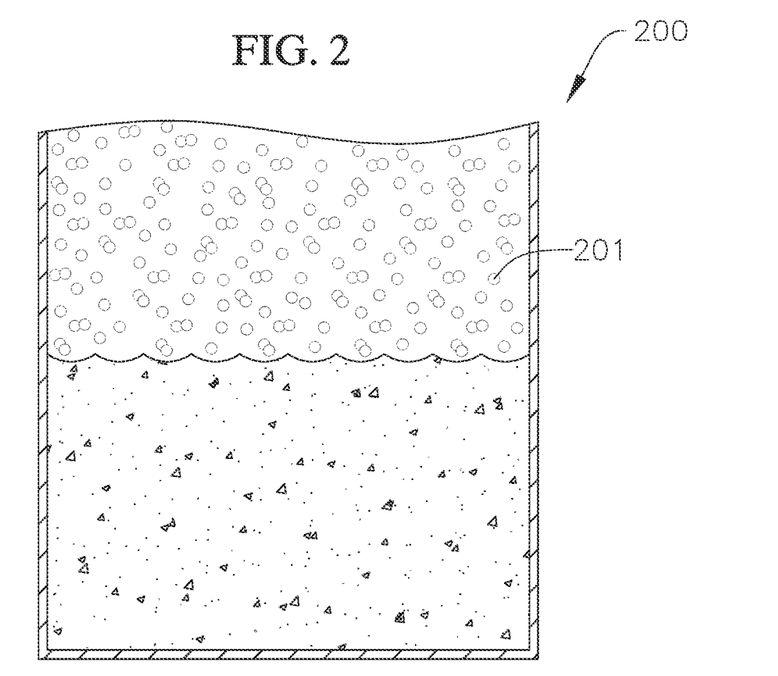
FIG. 2 is a side schematic view of a coffee beverage according to one embodiment of the present disclosure.

FIG. 2 depicts a coffee beverage 200 according to one embodiment of the present disclosure. In one embodiment, the coffee beverage 200 (e.g., cold brew coffee) is agitated or aerated such that a foam layer 201 (i.e., a "foam head") develops on an upper surface or an upper portion of the coffee beverage 200. The foam layer 201 on the coffee beverage 200 has the same benefits as the foam layer 103 described above (e.g., the foam layer 201 functions as a support for flavor-enhancing ingredients and/or decorative elements, and the foam layer 201 increases the aromatic profile, flavor profile, and "creaminess" of the coffee beverage 200). In one or more embodiments, the coffee beverage 200 may be provided without liquid additives, such as carbonated water, a dairy product, or a non-dairy substitute (e.g., soy milk or almond milk) to achieve the foam layer 201. That is, in one or more embodiments, the agitated or aerated coffee beverage 200 may be provided without any other liquid ingredients, but it may contain non-liquid flavor enhancing ingredients, such as powdered cinnamon or nutmeg.

Figure 3A:
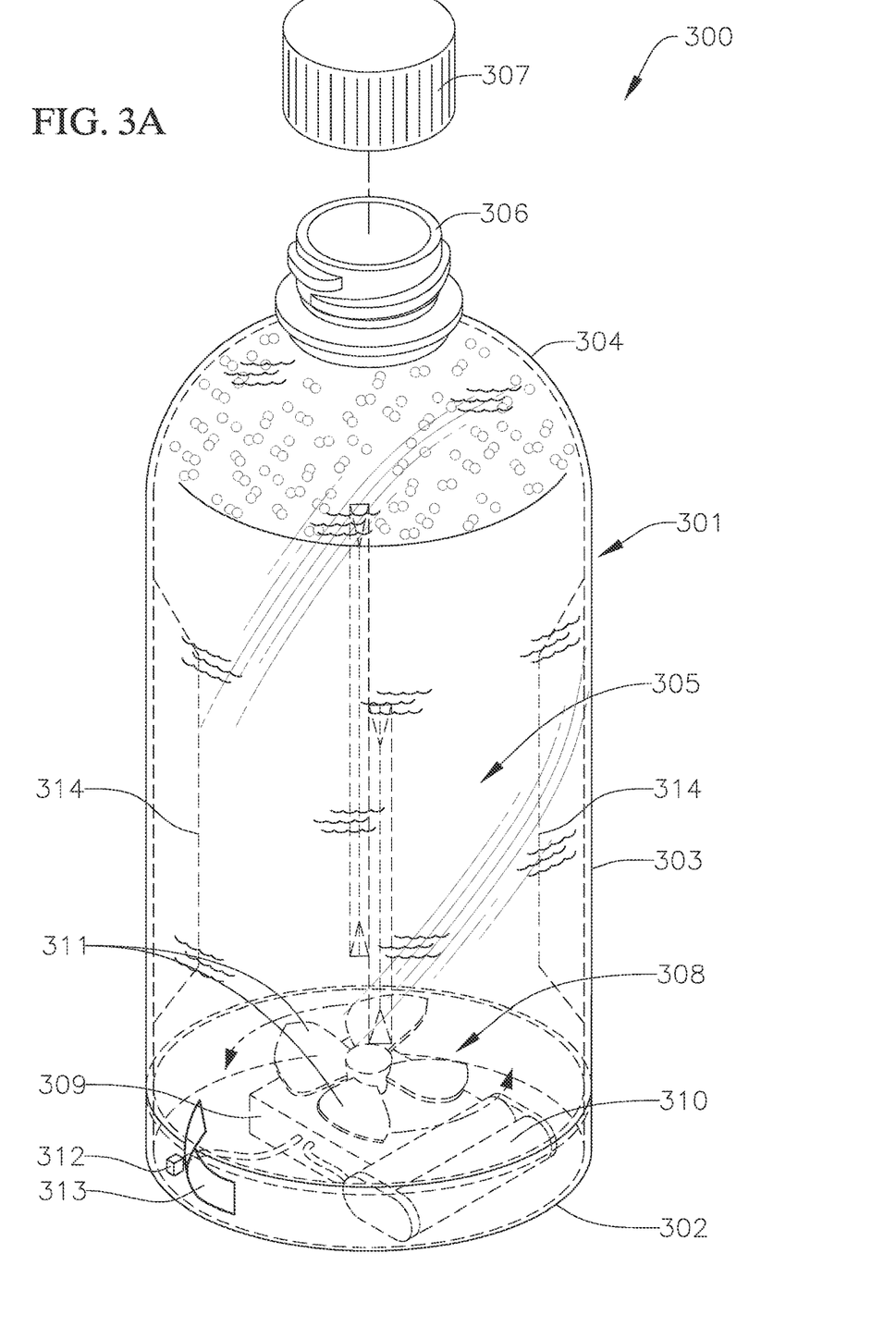
FIG. 3A is a schematic perspective view of a mixed beverage product including a container, a mixed beverage, and an agitator mechanism according to one embodiment of the present disclosure.
Figure 3B:
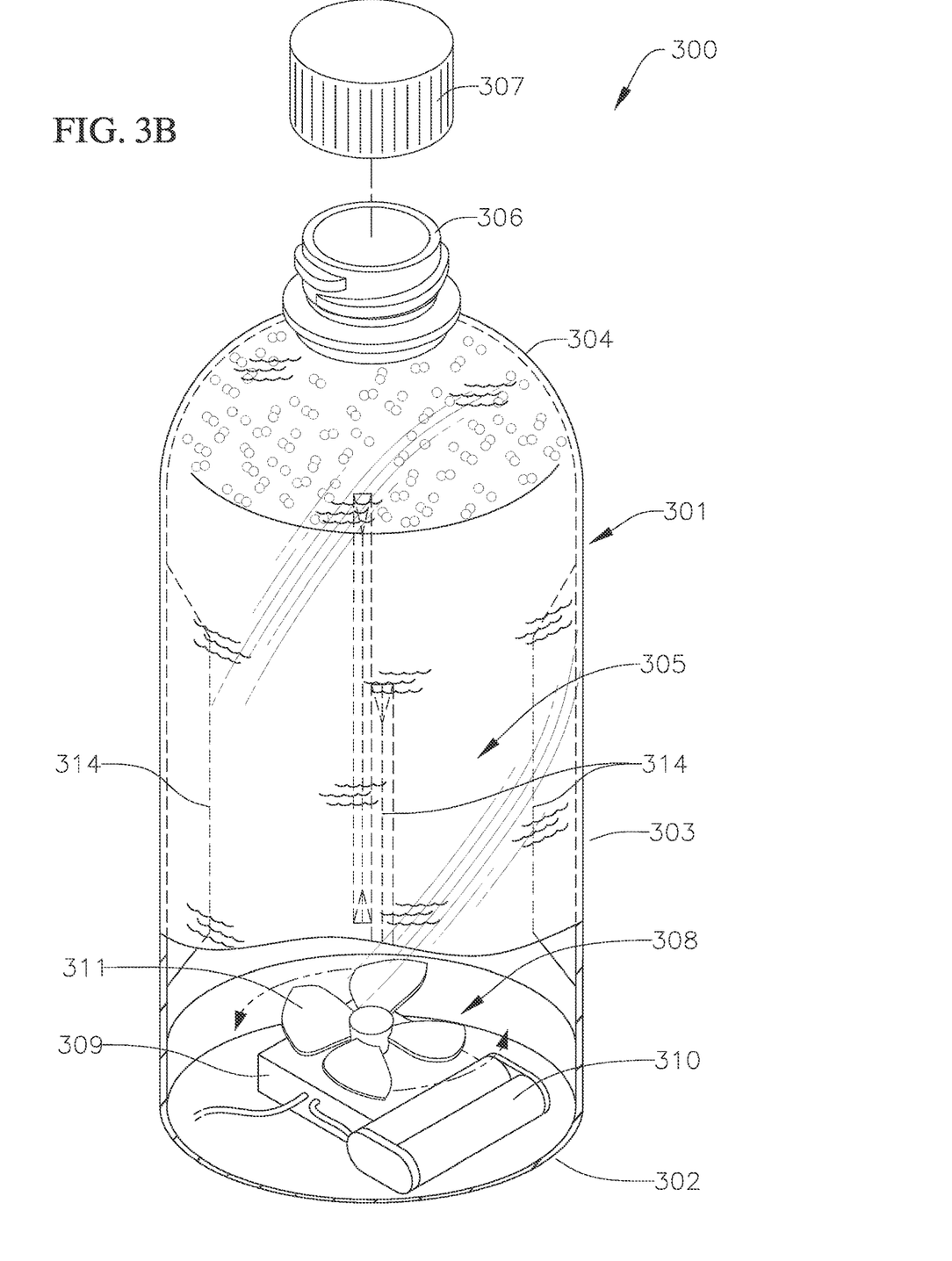
FIG. 3B is a schematic cutaway view of the embodiment of the mixed beverage product of FIG. 3A, revealing the agitator mechanism.
Figure 3C:
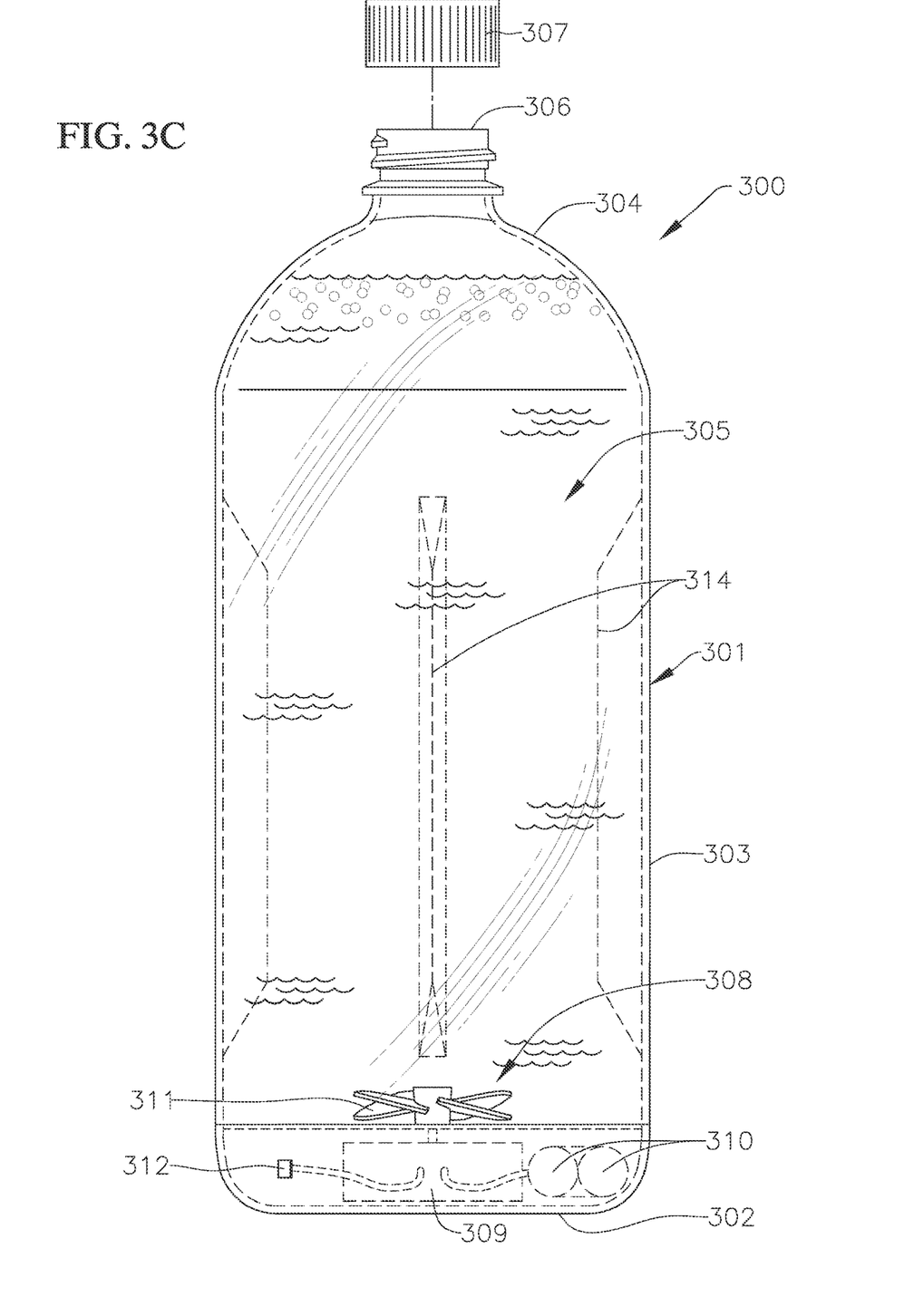
FIG. 3C is a schematic side view of the embodiment of the mixed beverage product illustrated in FIGS. 1A-1B.

With reference now to FIGS. 3A-3C, a point-of-sale mixed beverage product 300 according to one embodiment of the present disclosure includes a container 301. The container 301 may be any suitable type or kind of beverage container, such as a plastic bottle, a glass bottle, or a metal can. In the illustrated embodiment, the container 301 includes a base 302, at least one sidewall 303 (e.g., a cylindrical sidewall) extending up from the base 302, and an upper wall 304 (e.g., a neck) coupled to an upper portion of the at least one sidewall 303. Together, the base 302, the at least one sidewall 303, and the upper wall 304 define an interior chamber 305. The interior chamber 305 may contain the mixed beverage 100 (e.g., carbonated water 101 and a base beverage 102, such as fruit juice, vegetable juice, coffee, or combinations thereof) or the coffee beverage 200 (e.g., cold brew coffee without any liquid additives, such as carbonated water, dairy, or a non-dairy substitute), as described above. The upper wall 304 defines an upper opening 306 (e.g., a mouth) in fluid communication with the interior chamber 305.

Additionally, in the illustrated embodiment, the point-of-sale mixed beverage product 300 contains a removable cap 307 (e.g., a screw cap) sealing the upper opening 306. In one or more embodiments, the removable cap 307 may be configured to create an air-tight seal or a substantially air-tight seal configured to contain the carbonation of the mixed beverage 100 inside the interior chamber 305 of the container 300 such that the mixed beverage 100 contained in the container 301 is shelf-stable. When the removable cap 307 is removed, the mixed beverage 100 or the coffee beverage 200 may be poured out through the upper opening 306. In one or more embodiments, the cap 307 may have any other suitable configuration. For example, in one or more embodiments, the container 301 may be a metal can and the cap may be a depressible tab formed in the metal can.

Additionally, in the embodiment illustrated in FIGS. 3A-3C, the point-of-sale mixed beverage product 300 includes an agitator mechanism 308 configured to enable a user (e.g., a purchaser of the beverage product) to mix the mixed beverage 100 or the coffee beverage 200 contained in the container 301. The agitator mechanism 308 may have any suitable configuration configured to enable mixing of the mixed beverage 100 or the coffee beverage 200 at the point of use. In one embodiment, the agitator mechanism 308 includes an electric motor 309 on or connected to the base 302 of the container 301, at least one battery 310 connected to the electric motor 309, at least one mixing blade 311 (e.g., a series of mixing blades extending radially outward from a hub) inside the interior chamber 305 of the container 301 and connected to the electric motor 309, and an actuator 312 (e.g., a button or a switch) connected between the electric motor 309 and the battery 310. The actuator 312 may be positioned at any suitable location on the container 301 that is accessible to the user. For instance, in one or more embodiments, the actuator 312 may be positioned on a lower portion of the at least one sidewall 303, or on the base 302 of the container 301. In one or more embodiments, the actuator 312 may be concealed or protected behind a removable or openable enclosure 313 (e.g., a tear strip) to prevent inadvertent actuation of the actuator 312.

When the actuator 312 is actuated (e.g., depressed or switched), a circuit is completed between the battery 310 and the motor 309 such that power is supplied from the battery 310 to the motor 309. When the motor 309 is driven by the battery 310, the motor drives the one or more mixing blades 311 to move within the interior chamber 305 of the container 301 (e.g., the motor 309 causes the one or more mixing blades 311 to rotate (arrow 314) within the interior chamber 305), thereby mixing the mixed beverage 100, which, due to the carbonation in the carbonated water 101, causes the foam layer 103 to develop on an upper surface or the upper portion of the mixed beverage 100, as described above and depicted in FIG. 1. In one or more embodiments in which the container 301 contains the coffee beverage 200 without other liquid ingredients (e.g., without carbonated water, a dairy beverage, or a non-dairy beverage), the actuation of the one or more mixing blades 311 causes the one or more mixing blades 311 to agitate or aerate the coffee beverage 200, thereby causing the foam layer 201 to form on upper surface or the upper portion of the coffee beverage 200, as described above and depicted in FIG. 2.

Although in one or more embodiments the agitator mechanism 308 is a dynamic component (e.g., a powered, movable component), in one or more embodiments the agitator mechanism 308 may be (or may include) one or more passive or static components. The one or more passive or static components may be provided in addition to the one or more mixing blades 311, the motor 309, the battery 310, and the actuator 312, or the one or more passive or static components may be provided instead of the one or more mixing blades 311, the motor 309, the battery 310, and the actuator 312. For example, in one or more embodiments, the agitator mechanism 308 may include one or more static features, such as flutes, grooves, protuberances, and/or fins in the interior chamber of the container. In the illustrated embodiment, the agitator mechanism 308 includes a series of fins 314 circumferentially arranged around the sidewall 303 and extending radially inward into the interior chamber 305 of the container 301. Additionally, although in the illustrated embodiment the fins 314 are oriented such that the fins 314 extend lengthwise along a height direction of the sidewall 303 (e.g., the fins 314 extend in a direction from the base 302 to the upper wall 304), in one or more embodiments the fins 314 may have any other suitable orientation. In one or more embodiments in which the agitator mechanism 308 includes one or more static features, the user may move the container 301 (e.g., shake, rotate, and/or flip the container repeatedly) to cause the mixed beverage 100 or the coffee beverage 200 to engage the one or more static features (e.g., the fins 314), thereby mixing the mixed beverage 100 or the coffee beverage 200, which causes the foam layer 103 or 201 to develop on an upper surface or an upper portion of the mixed beverage 100 or the coffee beverage 200, as described above and illustrated in FIGS. 1 and 2. In this manner, the agitator mechanism 308 of the beverage product 300 is configured to create a foamy head on the mixed beverage 100 or the coffee beverage 200 without adding additional ingredients, such as dairy (milk or cream) or non-dairy ingredients (e.g., oat or soy milk), which might otherwise make the beverage unsuitable for individuals with dietary restrictions (e.g., lactose intolerant individuals or individuals on a ketogenic diet) and/or inconsistent with an individual's health goals, such as those individuals who practice intermittent fasting. Additionally, the agitator mechanism 308 enables cold preparation of the foam layer (i.e., the agitator mechanism 308 may eliminate the need for hot preparation, such as steaming, to achieve the foam layer). Thus, unlike conventional methods of forming a foam layer (e.g., utilizing a steamer to steam milk), the agitator mechanism 308 enables formation of the foam layer 103 or 201 on the mixed beverage 100 or the coffee beverage 200 on the go and it does not adversely affect the flavor profile of the beverage. For instance, in one embodiment in which the base beverage 102 of the mixed beverage 100 is coffee (e.g., cold brew coffee) or the beverage is the coffee beverage 200, the agitator mechanism 308 enables cold preparation of the foam layer on the mixed coffee beverage or the coffee beverage without carbonated water such that the coffee beverage retains the benefits of cold brew coffee (e.g., lower acidity while also achieving the benefits of a foam layer), which is conventionally available only with hot prepared beverages, such as cappuccinos. Thus, the agitator mechanism 308 eliminates the conventional tradeoff between cold prepared coffee, which has relatively low acidity but no foam layer, and hot prepared coffee beverages, which have a foam layer but relatively higher acidity. Furthermore, the agitator mechanism 308 introduces an experiential process (i.e., the process of forming the foam layer 103 is interactive and engaging), which may make the mixed beverage 100 more appealing, particularly to kids and other individuals who are averse to drinking certain beverages, such as fruit juice and vegetable juice beverages.

Figure 4:
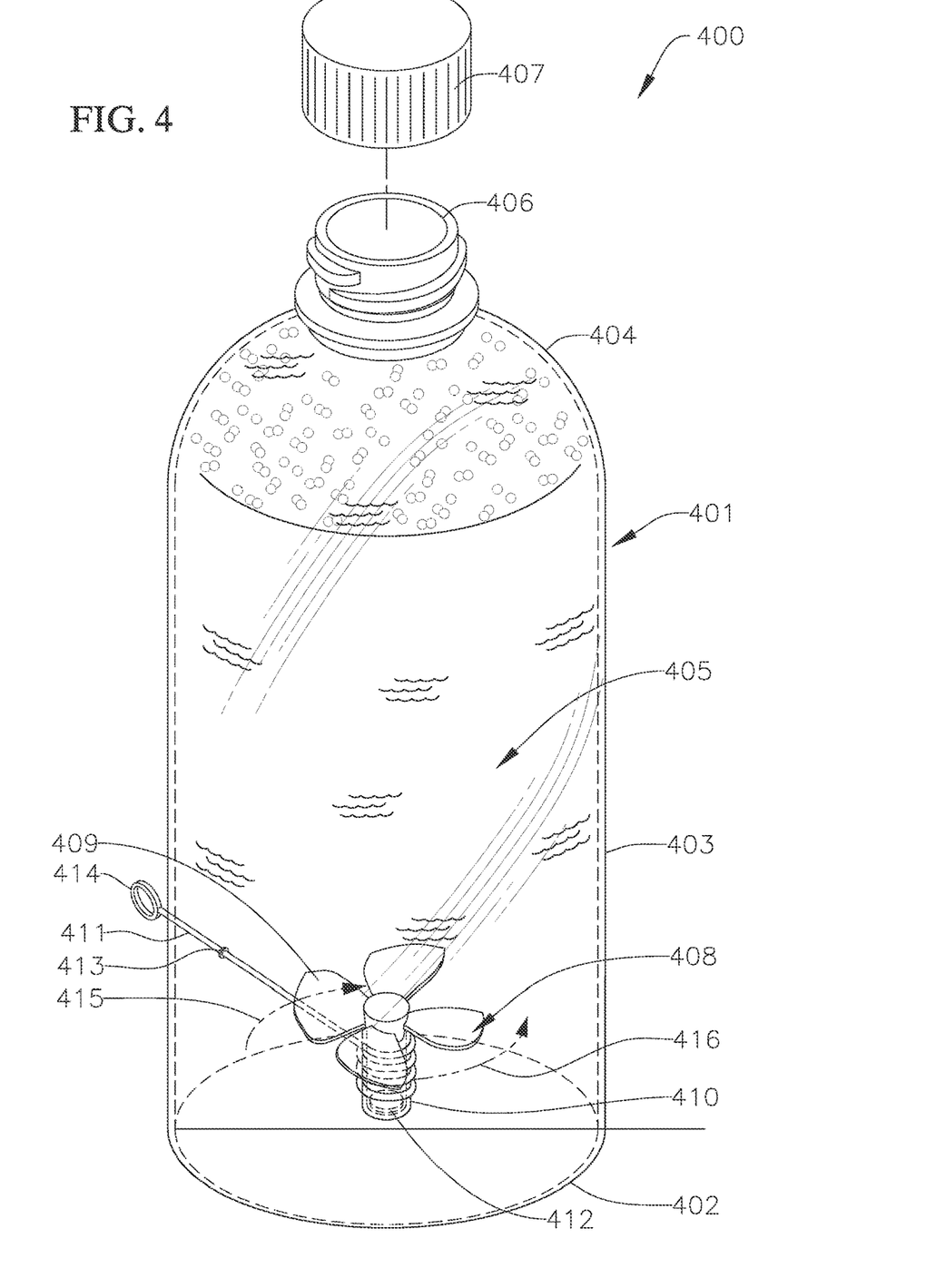
FIG. 4 is a schematic perspective view of a mixed beverage product including a container, a mixed beverage, and a manual agitator mechanism according to one embodiment of the present disclosure.

With reference now to FIG. 4, a point-of-sale mixed beverage product 400 according to another embodiment of the present disclosure includes a container 401 including a base 402, at least one sidewall 403 (e.g., a cylindrical sidewall) extending up from the base 402, and an upper wall 404 (e.g., a neck) coupled to an upper portion of the at least one sidewall 403. Together, the base 402, the at least one sidewall 403, and the upper wall 404 define an interior chamber 405. The interior chamber 405 may contain the mixed beverage 100 (e.g., carbonated water 101 and a base beverage 102, such as fruit juice, vegetable juice, coffee, or combinations thereof) or the coffee beverage 200 (e.g., cold brew coffee without any liquid additives, such as carbonated water, dairy, or a non-dairy substitute), as described above. The upper wall 404 defines an upper opening 406 (e.g., a mouth) in fluid communication with the interior chamber

405. Additionally, in the illustrated embodiment, the point-of-sale mixed beverage product 400 contains a removable cap 407 (e.g., a screw cap) sealing the upper opening 406.

Additionally, in the illustrated embodiment, the beverage product 400 includes an agitator mechanism 408 configured to enable a user (e.g., a purchaser of the beverage product) to mix the mixed beverage 100 or the coffee beverage 200 contained in the container 401. In the illustrated embodiment, the agitator mechanism 408 includes at least one mixing blade 409 (e.g., a series of mixing blades extending radially outward from a hub) inside the interior chamber 405 of the container 401, a rotatable shaft 410 coupled to the one or more mixing blades 409, a string or cable 411 wound around the rotatable shaft 410, and a spring 412 (e.g., a clock spring) coupled to the rotatable shaft 410 and the container 401. In one or more embodiments, the spring 412 may be housed in an interior of the rotatable shaft 410. The string 411 extends to an exterior of the container 401 through an opening 413 in the container 401 (e.g., an opening 413 in the sidewall 403 of the container 401). In the illustrated embodiment, the agitator mechanism 408 also includes a ring 414 coupled to an end of the string 411 outside of the container 401 that is configured to enable a user to easily pull the string 411. The ring 414 is also larger than the opening 413 in the container 401 such that the ring 414 is configured to prevent the string 411 from completely retracting into the interior of the container 401. In operation, when a user grasps the ring 414 and pulls, the string 411 unwinds from the rotatable shaft 410 and extends further out of the container 401. The unwinding of the string 411 from the shaft 410 causes the shaft 410 to rotate, which in turn causes the one or more mixing blades 409 to rotate (arrow 415) within the interior chamber 405. Additionally, as the user pulls on the string 411, the spring 412 is compressed, which generates or stores a restorative force in the spring 412. When the user releases the ring 414 (or at least reduces the tension applied to the string 411), the restorative force of the spring 412 is configured to rotate the rotatable shaft 410 and the one or more mixing blades 409 connected thereto in the opposite direction (arrow 416). The rotation (arrow 416) of the rotatable shaft 410 and the one or more mixing blades 409 is configured to re-wind the string 411 around the rotatable shaft 410 and thereby retract the string 411 into the container 401. In this manner, the string 411 may be repeatedly pulled and released to rotate (arrows 415 and 416) the at least one mixing blade 409 inside the interior chamber 405 of the container 401 to mix the mixed beverage 100 or the coffee beverage 200 to form the foam layer 103 or 201 (i.e., the foam head). Accordingly, unlike the embodiment illustrated in FIGS. 3A-3C in which the agitator mechanism 308 is electro-mechanically powered, the embodiment of the agitator mechanism 408 illustrated in FIG. 4 is manually operated by a user to mix the mixed beverage 100 or the coffee beverage 200 to form the foam layer 103 or 201.

Figure 5A:
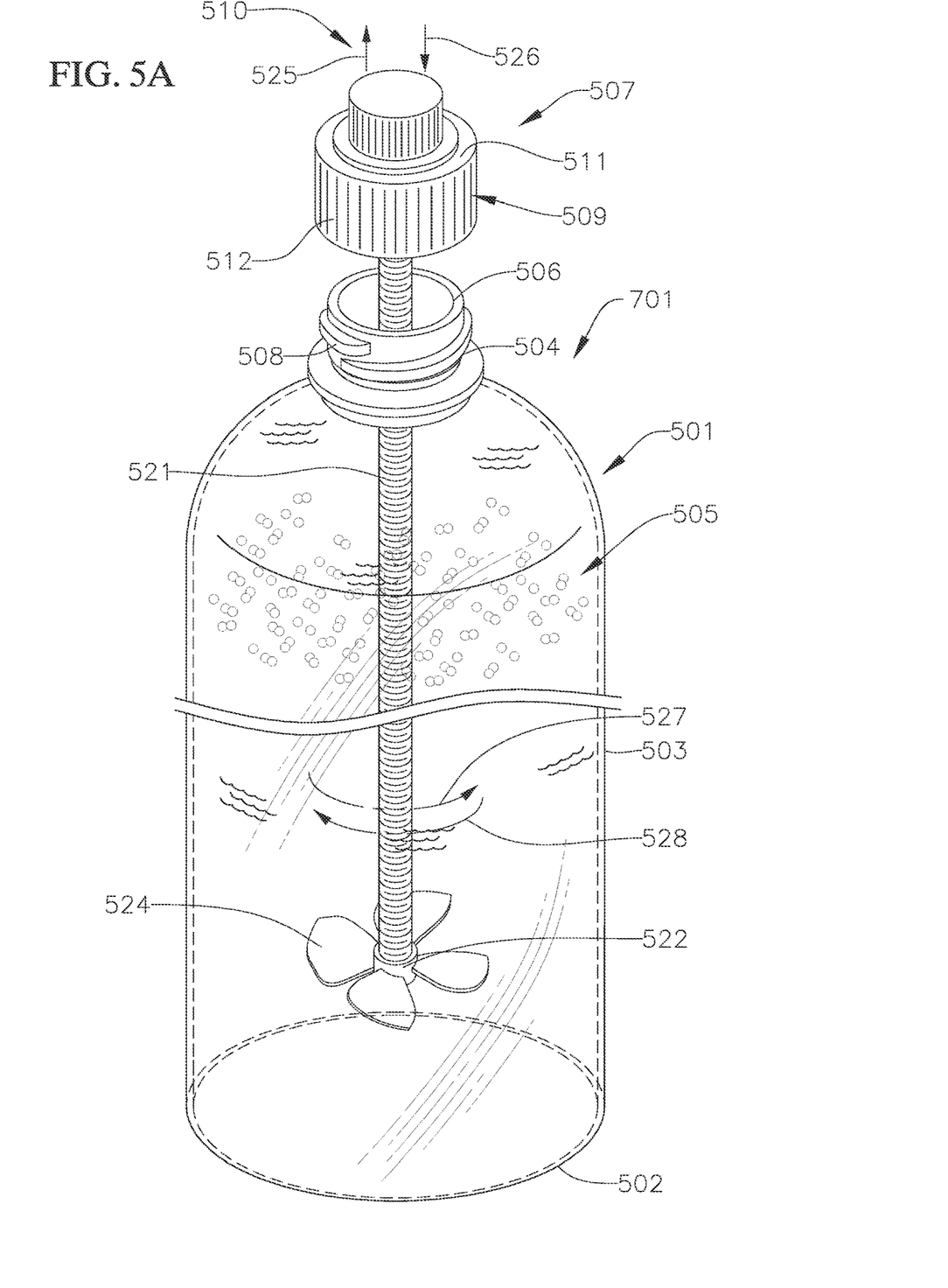
FIG. 5A is a schematic perspective view of a mixed beverage product including a container, a cap, a mixed beverage, and an agitator mechanism coupled to the cap according to one embodiment of the present disclosure.
Figure 5B:
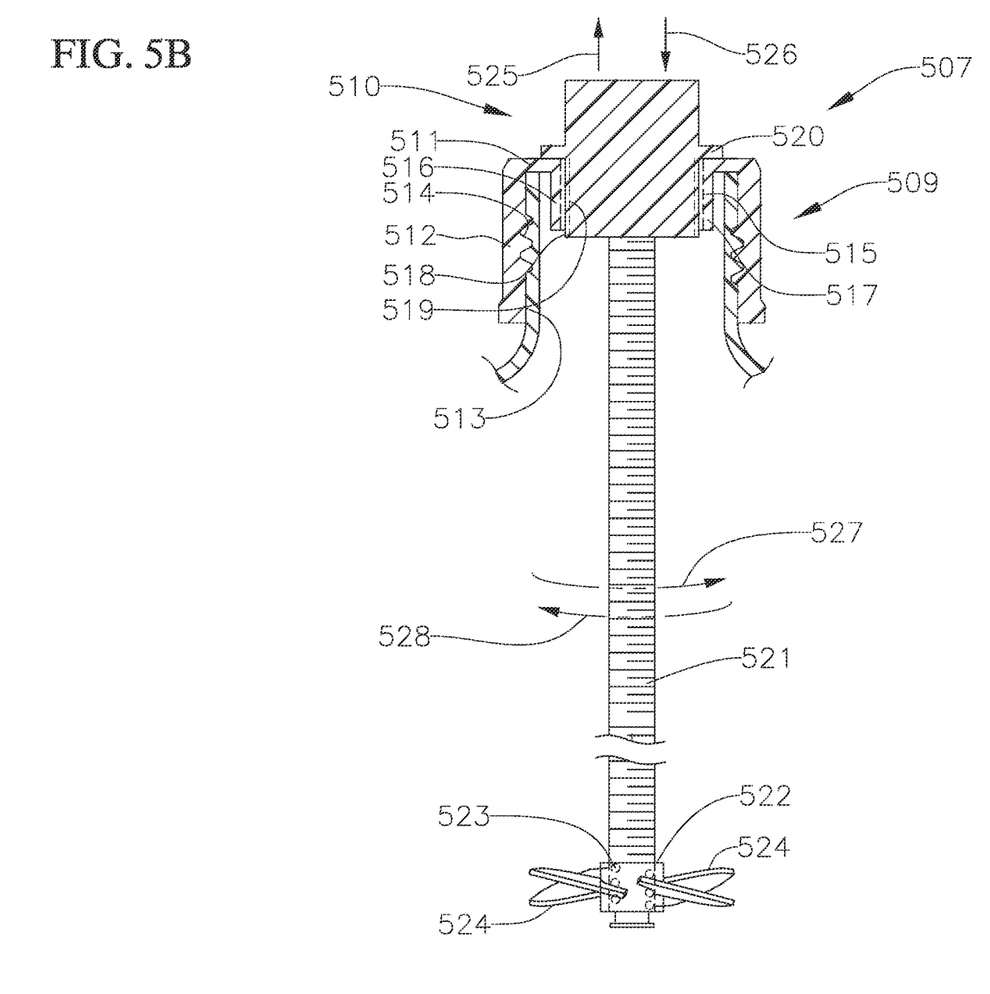
FIG. 5B is a schematic perspective view of the cap in the embodiment illustrated in FIG. 5A.

With reference now to FIGS. 5A-5B, a point-of-sale mixed beverage product 500 according to another embodiment of the present disclosure includes a container 501 including a base 502, at least one sidewall 503 (e.g., a cylindrical sidewall) extending up from the base 502, and a neck 504 coupled to an upper portion of the at least one sidewall 503. Together, the base 502, the at least one sidewall 503, and the neck 504 define an interior chamber 505. The interior chamber 505 may contain the mixed beverage 100 (e.g., carbonated water 101 and a base beverage 102, such as fruit juice, vegetable juice, coffee, or combinations thereof) or the coffee beverage 200 (e.g., cold brew coffee without any liquid additives, such as carbonated water, dairy, or a non-dairy substitute), as described above. The neck 504 defines an upper opening 506 (e.g., a mouth) in fluid communication with the interior chamber 505. Additionally, in the illustrated embodiment, the point-of-sale mixed beverage product 500 contains a removable screw cap 507 configured to threadedly engage threads 508 on an outer surface of the neck 504 and thereby seal the upper opening 506.

In the illustrated embodiment, the cap 507 includes an outer annular member 509 (e.g., an outer ring) and an inner annular member 510. In one or more embodiments, the outer and inner annular members 509, 510 may be concentric. In the illustrated embodiment, the outer annular member 509 includes a cover portion 511 and an outer flange 512 extending around and downward from an outer periphery (e.g., the outer circumference) of the cover portion 511. An inner surface 513 of the outer flange 512 includes threads 514 configured to threadedly engage the threads 508 on the neck 504 of the container 501. Additionally, in the illustrated embodiment, the cover portion 511 of the outer annular member 509 includes an opening 515 (e.g., a central hole). In the illustrated embodiment, the outer annular member 509 also includes an inner flange 516 extending around the periphery (e.g., the circumference) of the opening 515. In one or more embodiments, the inner flange 516 may extend upward from the cover portion 511, downward from the cover portion 511, or both upward and downward from the cover portion 511. The inner flange 516 includes threads 517 configured to threadedly engage the inner annular member 510.

In the illustrated embodiment, an outer surface 518 of the inner annular member 510 includes threads 519 configured to threadedly engage the threads 517 on the inner flange 516 of the outer annular member 509. In the illustrated embodiment, when the threads 519 of the inner annular member 510 are threaded into the threads 517 on the inner flange 516 of the outer annular member 509, a portion of the inner annular member 510 extends above the cover portion 511 of the outer annular member 509 to facilitate or enable a user grasping the inner annular member 510. In one or more embodiments, the cap 507 may include a stop configured to prevent the inner annular member 510 from be over-threaded into the outer annular member 509. In the illustrated embodiment, the outer annular member 509 includes a lip 520 that overhangs the cover portion 511 of the outer annular member 509. Engagement between the lip 520 and the cover portion 511 functions as a stop to prevent the inner annular member 510 from being threaded further into the outer annular member 509 such that the inner annular member 510 does not fall into the interior chamber 505 of the container 501 and a portion of the inner annular member 510 extends above the cover portion 511 of the outer annular member 509 when the inner annular member 510 is fully threaded into the outer annular member 509. In one or more embodiments, the cap 507 may also include a seal (e.g., an O-ring) between the inner annular member 510 and the outer annular member 509 to prevent the beverage from leaking out of the container between the inner and outer annular members 510 and 509.

In the illustrated embodiment, the mixed beverage product 500 also includes a ball screw 521 coupled to the inner annular member 510 and extending down into the interior chamber 505 of the container 501. The mixed beverage product 500 also includes a ball nut 522 rotatably coupled to the ball screw 521. The ball nut 522 includes a series of balls 523 (e.g., ball bearings) that are configured to circulate through the ball nut 522 as the ball nut 522 moves up and down along the ball screw 521. The ball nut 522 may be any suitable type or kind of ball nut, such as, for example, a ball nut with an external ball return system or a ball nut with an internal ball return system. Additionally, in the illustrated embodiment, the mixed beverage product 500 also includes at least one mixing blade 524 (e.g., a series of circumferentially arranged mixing blades) coupled to the ball nut 522. As described in more detail below, the ball nut 522 and the ball screw 521 are configured to covert the linear motion of the ball screw 521 to rotational motion of the ball nut 522 to rotate the one or more mixing blades 524. Together, the inner annular member 510 of the cap 507, the ball screw 521, the ball nut 522, and the one or more mixing blades 524 define an agitator mechanism for mixing or aerating the beverage 100 or 200 in the interior chamber 505 of the container 501. Additionally, providing the agitator mechanism (e.g., the inner annular member 510 of the cap 507, the ball screw 521, the ball nut 522, and the one or more mixing blades 524) as part of the cap 507 enables the use of the agitator mechanism with a conventional container (e.g., conventional plastic bottles).

In operation, the inner annular member 510 may be detached from the outer annular member 509 by rotating the inner annular member 510 relative to the outer annular member 509 such that the threads 519 of the inner annular member 510 disengage the threads 517 on the outer annular member 509. In the illustrated embodiment, the direction of the threads 517 on the outer annular member 509 of the cap 507 are opposite the direction of the threads 519 on the inner annular member 510 (e.g., the threads 517 on the outer annular member 509 of the cap 507 are counterclockwise threads and the threads 519 on the inner annular member 510 are clockwise threads). Accordingly, when the inner annular member 510 is rotated to separate the inner annular member 510 from the outer annular member 509, the outer annular member 509 of the cap 507 is not detached from the container 501. Instead, the rotation of the inner annular member 510 to separate the inner annular member 510 from the outer annular member 509 tends to tighten the outer annular member 509 of the cap 507 to the threads 508 on the neck 504 of the container 501.

Once the inner annular member 510 is detached from the outer annular member 509, the user may grasp the inner annular member 510 and move the inner annular member 510 of the cap 507, and the ball screw 521 coupled thereto, to repeatedly withdraw (arrow 525) a portion of the ball screw 521 from the interior chamber 505 of the container 501 and to reinsert (arrow 526) a portion of the ball screw 521 into the interior chamber 505 of the container 501 (e.g., the user repeatedly move (arrows 525, 526) the inner annular member 510 of the cap 507 and the ball screw 521 coupled thereto up and down). The linear movement of the ball screw 521 causes the ball screw 521, and the one or more mixing blades 524 coupled thereto, to rotate around the ball screw 521. For example, in one or more embodiments, withdrawing (arrow 525) the ball screw 521 from the interior chamber 505 of the container 501 is configured to rotate (arrow 527) the ball nut 522 and the one or more mixing blades 524 in a first direction and inserting (arrow 526) the ball screw 521 into the interior chamber 505 of the container 501 is configured to rotate (arrow 528) the ball nut 521 and the one or more mixing blades 524 in a section direction opposite the first direction. In this manner, the ball screw 521 may be repeatedly raised and lowered (arrows 525 and 526) to rotate (arrows 527 and 528) the at least one mixing blade 524 inside the interior chamber 505 of the container 501 to mix the mixed beverage 100 or the coffee beverage 200 to form the foam layer 103 or 201 (i.e., the foam head). Once the beverage has been sufficiently agitated and/or mixed, the outer annular member 509 may be rotated to cause the threads 514 on the outer annular member 509 to disengage the threads 508 on the neck 504 of the container 501, and thereby permit the user to remove the cap 507 from the container 501 and pour the beverage from the interior chamber 505 of the container.

Figure 6:
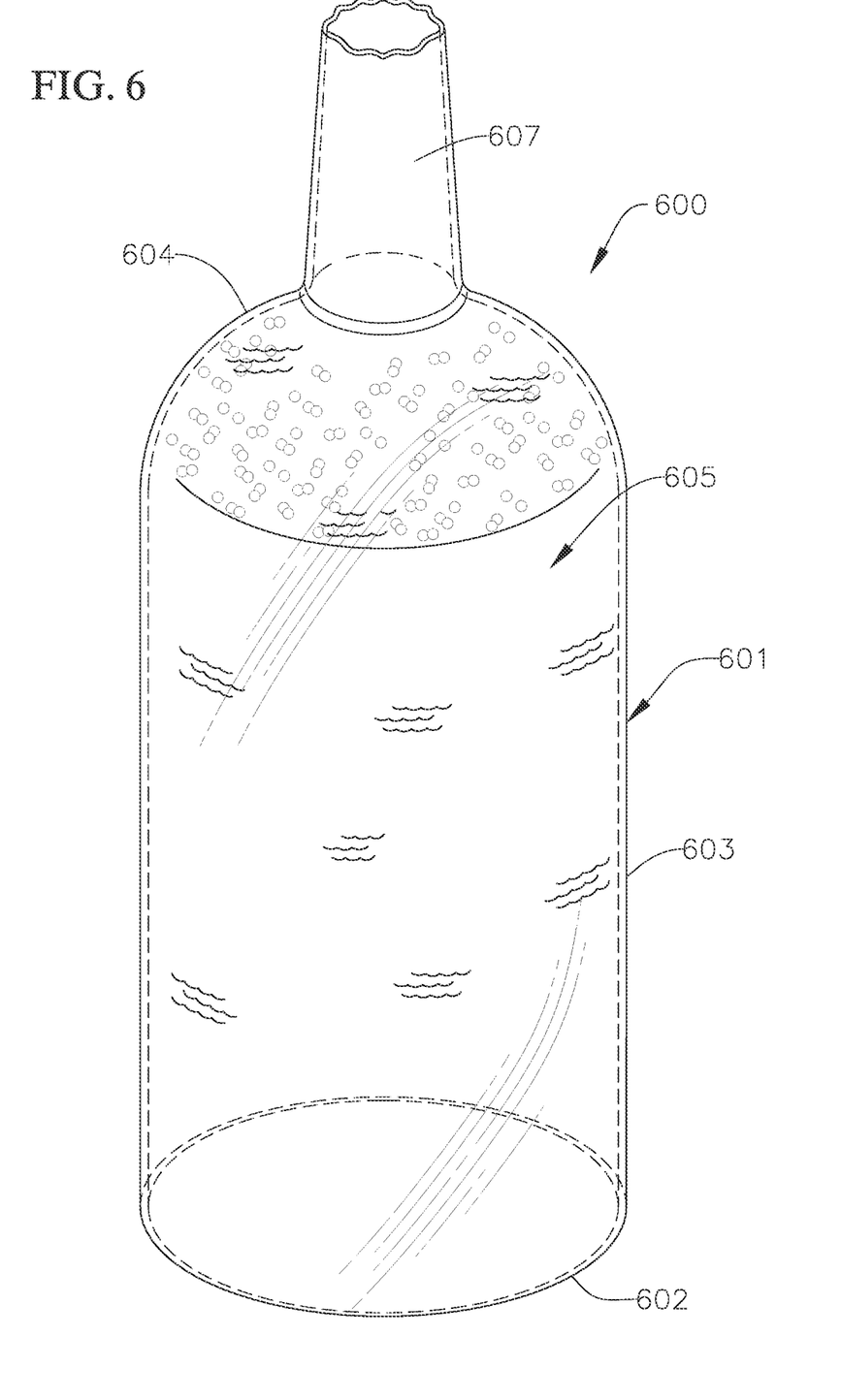
FIG. 6 is a schematic perspective view of a mixed beverage product including a container, a mixed beverage, and a pressurized gas according to one embodiment of the present disclosure.

With reference now to FIG. 6, a mixed beverage product 600 according to another embodiment of the present disclosure includes a can 601 (e.g., a metal can) including a base 602, at least one sidewall 603 (e.g., a cylindrical sidewall) extending up from the base 602, and an upper wall 604 coupled to an upper portion of the at least one sidewall 603. Together, the base 602, the at least one sidewall 603, and the upper wall 604 define an interior chamber 605. The interior chamber 605 may contain the mixed beverage 100 (e.g., carbonated water 101 and a base beverage 102, such as fruit juice, vegetable juice, coffee, or combinations thereof) or the coffee beverage 200 (e.g., cold brew coffee without any liquid additives, such as carbonated water, dairy, or a non-dairy substitute), as described above, and a pressurized gas (e.g., nitrous oxide). The upper wall 604 defines an upper opening 606 in fluid communication with the interior chamber 605.

Additionally, in the illustrated embodiment, the point-of-sale mixed beverage product 600 contains a nozzle 607 (e.g., a nipple) coupled to the upper wall 604 of the can 601 at the opening 606 in the upper wall 604. The nozzle 607 includes a valve configured to selectively release the beverage 100 or 200 from the interior chamber 605 of the can 601.

In operation, when the nozzle 607 is depressed or deflected (or otherwise actuated), the pressured gas escapes from the container 601 and forces the mixed beverage 100 or the coffee beverage 200 out of the can 601. Additionally, the escaping pressurized gas agitates or aerates the mixed beverage 100 or the coffee beverage 200 contained in the can 601 such that a foam layer (i.e., a foam head) forms on the mixed beverage 100 or the coffee beverage 200. In one or more embodiments, the pressurized gas inside the interior chamber 605 of the can 601 may be provided in any suitable form, such as, for example, in a pill (e.g., a nitrogen pill).

Figure 7:
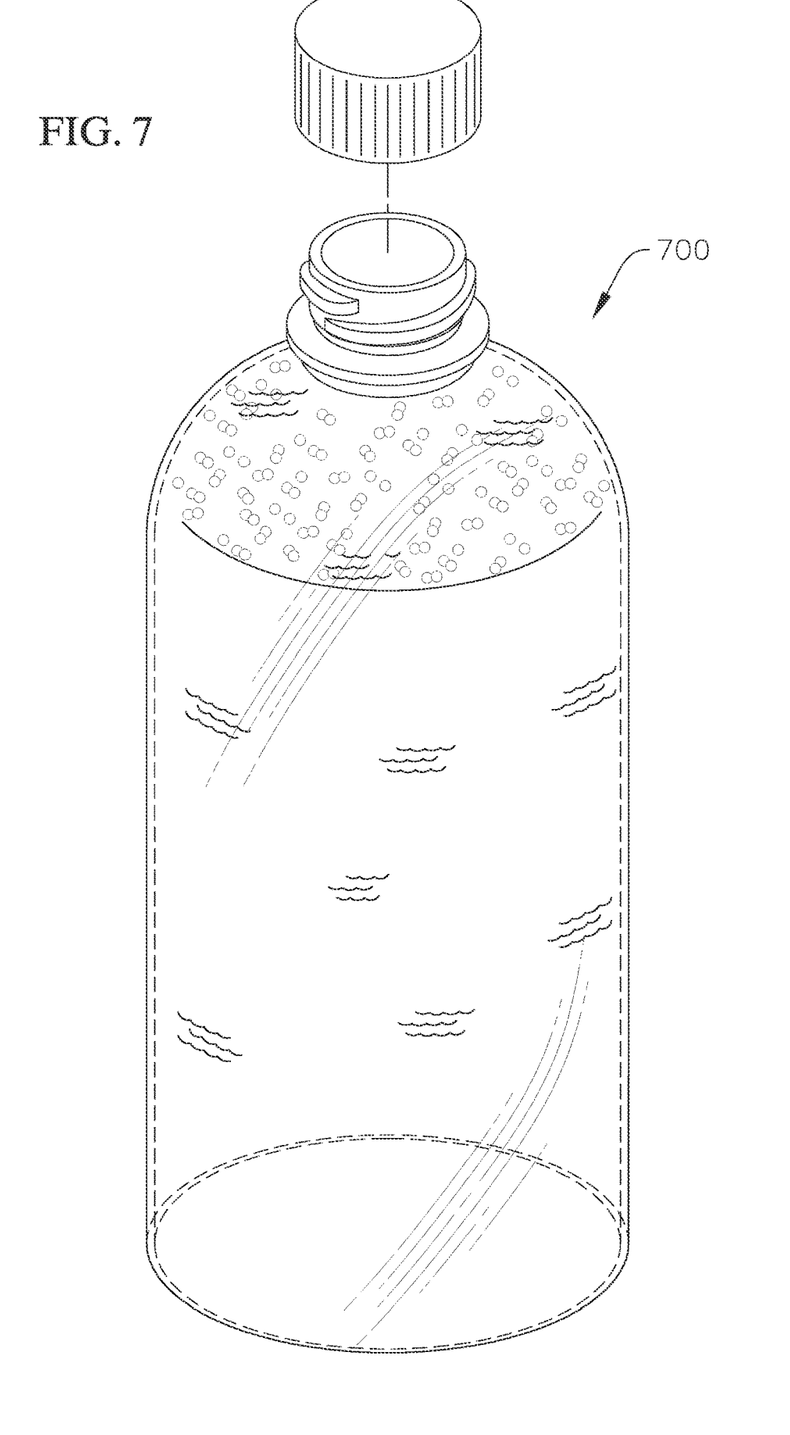
FIG. 7 is a schematic perspective view of a mixed beverage product according to another embodiment of the present disclosure without an agitator mechanism.

In one or more embodiments, the point-of-sale mixed beverage product may be provided without the agitator mechanism, as shown in FIG. 7. For instance, in one or more embodiments, the mixed beverage may be prepared in a manufacturing facility (e.g., by agitating, such as by mixing, stirring, blending, and/or shaking a mixture of carbonated water and a base beverage to form a foam layer on the mixed beverage), injecting or otherwise inserting the mixed beverage into a container (e.g., a glass or plastic bottle, or a metal can), and then sealing the mixed beverage and the foam layer inside the container with a liquid-tight cap or other means to retain the carbonation inside the container and thereby achieve a shelf-stable mixed beverage product 700 with a foam layer (i.e., a foam head). In one or more embodiments, the point-of-sale beverage product 700 may include coffee without any other liquid ingredients (i.e., coffee not mixed with carbonated water, a dairy beverage, or a non-dairy substitute). For instance, in one or more embodiments, a coffee beverage (e.g., cold brew coffee) may be agitated in a manufacturing facility (e.g., by shaking or stirring). The agitation is configured to aerate the coffee beverage, which forms a foam layer on the coffee beverage. The agitated coffee product (with a foam layer thereon) may then be injected or otherwise inserted into a container (e.g., a glass or plastic bottle, or a metal can), and then sealed with a liquid-tight cap or other means to retain the aerated coffee beverage inside the container and thereby achieve a shelf-stable coffee beverage product with a foam layer (i.e., a foam head).

Figure 8:
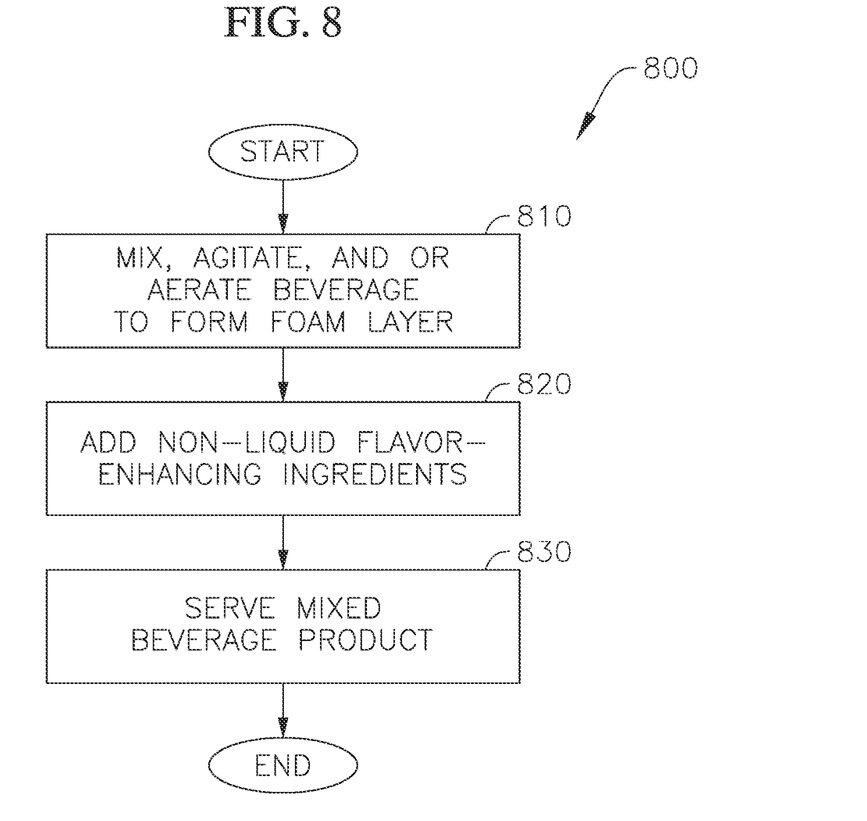
FIG. 8 is a flowchart illustrating tasks of a method of manufacturing a mixed beverage according to one embodiment of the present disclosure.

In one or more embodiments, the mixed beverage product may be prepared at a point-of-sale location (e.g., at a juice bar, a coffee shop, or a restaurant). FIG. 8 is a flowchart illustrating tasks of a method 800 of preparing a mixed beverage product at a point-of-sale location according to one embodiment of the present disclosure. In the illustrated embodiment, the method 800 includes a task 810 of mixing, agitating, and/or aerating a beverage to form a foam layer on the beverage. For instance, in one or more embodiments, carbonated water (e.g., carbonated mineral water) and a base beverage (e.g., fruit juice, vegetable juice, coffee, or combinations thereof) may be mixed together or otherwise agitated (e.g., utilizing a blender) at a point-of-sale location to produce the mixed beverage product with a foam layer (i.e., a foam head) thereon. In another embodiment, a coffee beverage (e.g., cold brew coffee) without any other liquid ingredients (e.g., mineral water, a dairy beverage, or a non-dairy substitute) may be agitated (e.g., in a blender) to produce a coffee beverage with a foam layer (i.e., a foam head). Additionally, in one or more embodiments, the method 800 may include a task 820 of adding one or more non-liquid flavor enhancing ingredients, such as powdered cinnamon or nutmeg, onto the foam layer formed in task 810. However, in one or more embodiments, the method 800 may not include the task 820 of adding one or more non-liquid flavor enhancing ingredients onto the foam layer. Additionally, in the illustrated embodiment, the method 800 includes a task 830 of serving the mixed beverage product.

While this invention has been described in detail with particular references to exemplary embodiments thereof, the exemplary embodiments described herein are not intended to be exhaustive or to limit the scope of the invention to the exact forms disclosed. Persons skilled in the art and technology to which this invention pertains will appreciate that alterations and changes in the described systems and methods of operation can be practiced without meaningfully departing from the principles, spirit, and scope of this invention, as set forth in the following claims, and equivalents thereof.

What is claimed is:

1. A product comprising:
   a container defining an interior chamber, the container being a bottle or a can;
   an agitator mechanism in the interior chamber; and
   a beverage sealed in the inner chamber in the container, the beverage consisting of carbonated water and a non-dairy base beverage, the non-dairy base beverage being selected from the group consisting of fruit juice, veggie juice, and coffee,
   wherein the agitator is configured to mix the beverage to form a foam layer on the beverage.

2. The product of claim 1, wherein the agitator mechanism comprises a static feature.

3. The product of claim 2, wherein the static feature is selected from the group consisting of a flute, a groove, a protuberance, and a fin.

4. A product comprising:
   a container defining an interior chamber, the container being a bottle or a can;
   an agitator mechanism in the interior chamber; and
   a beverage sealed in the inner chamber in the container, the beverage consisting of carbonated water and a non-dairy base beverage,
   wherein the agitator is configured to mix the beverage to form a foam layer on the beverage, and
   wherein the agitator mechanism comprises:
      a motor;
      a battery coupled to the motor;
      an actuator configured to selectively couple the battery to the motor; and
      at least one mixing blade coupled to a drive shaft of the motor.

5. A product comprising:
   a container defining an interior chamber;
   an agitator mechanism in the interior chamber; and
   a beverage contained in the inner chamber in the container,
   wherein the agitator is configured to mix the beverage to form a foam layer on the beverage,
   wherein the agitator mechanism comprises:
      a rotatable shaft;
      at least one mixing blade coupled to the rotatable shaft;
      a string wound around the rotatable shaft and extending to an exterior of the container; and
      a spring coupled to the rotatable shaft,
   wherein pulling the string is configured to unwind the string from the rotatable shaft and to rotate the rotatable shaft and the at least one mixing blade, and
   wherein the spring is configured to rewind the string around the rotatable shaft.

6. A product comprising:
   a container defining an interior chamber;
   an agitator mechanism in the interior chamber;
   a beverage contained in the inner chamber in the container; and
   a cap threadedly coupled to the container, the cap comprising:
      an outer annular member threadedly coupled to the container; and
      an inner annular member threadedly coupled to the outer annular member,
   wherein the agitator is configured to mix the beverage to form a foam layer on the beverage.

7. The product of claim 6, wherein the agitator mechanism comprises:
   a ball screw coupled to the inner annular member;
   a ball nut coupled to the ball screw; and
   at least one mixing blade coupled to the ball nut.

* * * * *